US009781358B2

(12) United States Patent
Sizemore et al.

(10) Patent No.: US 9,781,358 B2
(45) Date of Patent: Oct. 3, 2017

(54) 12G-SDI SWITCHER WITH INTEGRATED PROCESSING OF QUAD-LINK 3G-SDI

(71) Applicant: Ross Video Limited, Iroquois (CA)

(72) Inventors: Donald Mark Sizemore, Virginia Beach, VA (US); Jonathan Todd Riggs, Chesapeake, VA (US); Scott Raymond Kaneta, Virginia Beach, VA (US); Christopher Jason Williams, Chesapeake, VA (US)

(73) Assignee: ROSS VIDEO LIMITED, Iroquois (CA)

(*) Notice: Subject to any disclaimer, the term of this patent is extended or adjusted under 35 U.S.C. 154(b) by 0 days.

(21) Appl. No.: 15/259,895

(22) Filed: Sep. 8, 2016

(65) Prior Publication Data

US 2017/0070700 A1   Mar. 9, 2017

Related U.S. Application Data

(60) Provisional application No. 62/215,693, filed on Sep. 8, 2015.

(51) Int. Cl.
| | |
|---|---|
| *H04N 7/01* | (2006.01) |
| *H04N 5/268* | (2006.01) |
| *H04H 20/26* | (2008.01) |
| *H04N 7/015* | (2006.01) |
| *H04N 21/236* | (2011.01) |
| *H04N 21/238* | (2011.01) |
| *H04N 21/422* | (2011.01) |

(52) U.S. Cl.
CPC ............ *H04N 5/268* (2013.01); *H04H 20/26* (2013.01); *H04N 7/015* (2013.01); *H04N 21/238* (2013.01); *H04N 21/23602* (2013.01); *H04N 21/42204* (2013.01)

(58) Field of Classification Search
CPC ..... H04N 7/0117; H04N 7/0152; H04N 5/268
USPC ......................................................... 348/441
See application file for complete search history.

(56) References Cited

U.S. PATENT DOCUMENTS

| | | | | |
|---|---|---|---|---|
| 2009/0256859 | A1* | 10/2009 | Komorowski | ....... H04N 5/2624 345/629 |
| 2014/0211094 | A1* | 7/2014 | Minamoto | ............... H04N 5/38 348/723 |

OTHER PUBLICATIONS

The Society of Motion Picture and Television Engineers, SMPTE Standard—Image Format and Ancillary Data Mapping for the Quad Link 3 Gb/s Serial Interface, SMPTE ST 425-5:2015, Mar. 26, 2015, pp. 1-28.

(Continued)

*Primary Examiner* — Michael Lee
(74) *Attorney, Agent, or Firm* — Wolf, Greenfield & Sacks, P.C.

(57) ABSTRACT

In the broadcast video environment, it may sometimes be necessary to switch between 12G-SDI, which is a 12 Gbps interface on a single link, and quad-link 3G-SDI, which uses four 3 Gbps physical links. A routing switcher is disclosed herein that routes 12G-SDI signals between input ports and output ports. However, the apparatus also has the capability to receive quad-link 3G-SDI signals at its input ports and internally convert from quad-link 3G-SDI to 12G-SDI. The apparatus also has the capability to internally convert a 12G-SDI signal into a quad-link 3G-SDI signal for output on its output ports. Additional processing, such as link healing and/or deskewing of incoming quad-link 3G-SDI signals may be performed.

22 Claims, 8 Drawing Sheets

(56) References Cited

OTHER PUBLICATIONS

The Society of Motion Picture and Television Engineers, SMPTE Standard—Transport of High Bit Rate Media Signals over IP Networks (HBRMT), SMPTE ST 2022-6: 2012, Oct. 9, 2012, pp. 1-16.

\* cited by examiner

12G-SDI SWITCHER WITH INTEGRATED PROCESSING OF QUAD-LINK 3G-SDI

PRIORITY CLAIM

This application claims priority to U.S. Provisional Patent Application Ser. No. 62/215,693, filed on Sep. 8, 2015, which is incorporated herein by reference.

FIELD

The present application relates to the processing and routing of ultra-high definition (UHD) signals that are transported using quad-link 3G-SDI and/or 12G-SDI.

BACKGROUND

In the broadcast audio/video environment, video and audio signals are typically represented in a digital manner, and different transports may be used to move these signals between different equipment. One such transport is Serial Digital Interface (SDI), which is specified by the Society of Motion Pictures and Television Engineers (SMPTE) and the International Telecommunications Union (ITU). This signal transport carries audio and video signals in a serial bit stream between devices over a variety of media, including coaxial cable or fiber optic cable.

The SDI standards can represent a wide variety of video standards, including National Television System Committee (NTSC), Phase Alternating Line (PAL), High Definition (HD) Television (1080i, 720p, 1080p), or Ultra-High Definition (UHD) Television (2160p). Depending upon the video standard being carried, the data rate of an SDI transport may vary among a number of pre-defined rates, ranging from 270 megabits per second (270 Mbps) up to 12 gigabits per second (12 Gbps).

As new standards are defined, the technology to fully implement these standards sometimes trails. In these situations, bridge technologies may be defined. For example, when High Definition Serial Data Interface (HD-SDI) evolved from 1.5 Gbps transport to 3 Gbps transport, a bridge standard was defined that allows a 3 Gbps payload to be carried over two 1.5 Gbps physical links. This is known as a "dual-link".

Similarly, when 12 Gbps Serial Digital Interface (12G-SDI) Ultra-High Definition standards were defined, a bridge standard was also defined that allows a 12 Gbps payload to be carried over four 3 Gbps physical links. This is known as "quad-link 3G-SDI".

SUMMARY

It some installations it may be necessary to switch between 12G-SDI, which is a 12 Gbps interface on a single link, and quad-link 3G-SDI, which uses four 3 Gbps physical links.

In one embodiment, an apparatus, such as a routing switcher, is provided that routes 12G-SDI signals between input ports and output ports. However, the apparatus also has the capability to receive quad-link 3G-SDI signals at its input ports and internally convert from quad-link 3G-SDI to 12G-SDI. The apparatus also has the capability to internally convert a 12G-SDI signal into a quad-link 3G-SDI signal for output on its output ports. In some embodiments, additional processing, such as link healing and deskewing of incoming quad-link 3G-SDI signals, may be performed.

According to one embodiment, there is provided an apparatus having a plurality of input ports and a plurality of output ports. The apparatus further includes a switch matrix to route 12G-SDI signals between the input ports and the output ports. A first convertor may be interposed between the input ports and the switch matrix. The first convertor converts a quad-link 3G-SDI signal received at four of the input ports into a 12G-SDI signal destined for the switch matrix. A second convertor may be interposed between the switch matrix and the output ports. The second convertor converts a 12G-SDI signal received from the switch matrix into a quad-link 3G-SDI signal destined for four of the output ports. In some embodiments, the apparatus may be a routing switcher or a production switcher or a master control switcher.

In some embodiments, the apparatus includes a link healer interposed between the input ports and the switch matrix. The link healer performs interpolation to compute missing pixel values when one or two or three links of the quad-link 3G-SDI signal received at the input ports have failed. The interpolation uses pixel values received on one or more links of the quad-link 3G-SDI signal that have not failed. The interpolation may be bilinear interpolation. For example, if a single link fails, then interpolation may be performed using pixel values from one, some, or all of the other three links, which have not failed.

In some embodiments, the apparatus includes a deskewer interposed between the input ports and the switch matrix. The deskewer removes skew from the quad-link 3G-SDI signal received at the input ports.

In some embodiments, a sampler is interposed between the input ports and the switch matrix. The sampler performs at least one of upsampling and downsampling of at least one signal received at the input ports. In one embodiment, the sampler performs trunking by: (i) downsampling each of a plurality of signals received at the input ports to produce a plurality of downsampled signals; and (ii) combining the downsampled signals into a 12G-SDI signal to be sent to the switch matrix. In one embodiment, the sampler is to: (i) generate four 3 Gbps signals by: for each input port of four of the input ports, downsampling a 12G-SDI signal received at the input port into a 3 Gbps signal; and (ii) combine the four 3 Gbps signals into a 12G-SDI signal to be sent to the switch matrix.

In some embodiments, a sampler is also or instead interposed between the switch matrix and the output ports. The sampler performs at least one of upsampling and downsampling of at least one signal received from the switch matrix. In one embodiment, the sampler performs trunking by: (i) downsampling each of a plurality of 12G-SDI signals received from the switch matrix to produce a plurality of downsampled signals; and (ii) combining the downsampled signals into an output signal to be sent out one of the output ports. In one embodiment, the sampler is to: (i) downsample each one of three 12G-SDI signals received from the switch matrix to generate three 3 Gbps signals; and (ii) incorporate the three 3 Gbps signals into a 10 Gbps Ethernet signal to be sent out of an output port.

In some embodiments, the first convertor is to convert from quadrant mapping quad-link 3G-SDI to 12G-SDI and/or from two sample interleave mapping quad-link 3G-SDI to 12G-SDI. In some embodiments, the second convertor is to convert from 12G-SDI to quadrant mapping quad-link 3G-SDI and/or from 12G-SDI to two sample interleave mapping quad-link 3G-SDI.

In another embodiment, there is provided a method in a routing apparatus that includes receiving a quad-link 3G-SDI signal at four input ports of the apparatus. The method further includes converting the quad-link 3G-SDI signal into a corresponding 12G-SDI signal within the apparatus, and routing the corresponding 12G-SDI signal through a switch matrix in the apparatus.

In another embodiment, there is provided a method in a routing apparatus that includes converting, within the apparatus, a 12G-SDI signal from a switch matrix into a corresponding quad-link 3G-SDI signal, and then forwarding the corresponding quad-link 3G-SDI signal to four output ports of the apparatus.

In another embodiment, there is provided a method that includes receiving a quad-link 3G-SDI signal at four input ports of a routing apparatus. The quad-link 3G-SDI signal is converted into a corresponding 12G-SDI signal within the apparatus. The corresponding 12G-SDI signal is routed through a switch matrix of the apparatus. A 12G-SDI signal from the switch matrix (not necessarily the corresponding 12G-SDI signal) may also be converted into a corresponding quad-link 3G-SDI signal. The corresponding quad-link 3G-SDI signal may be routed to four output ports of the apparatus.

In some embodiments, a method further includes performing interpolation in the apparatus to compute missing pixel values when one or two or three links of the quad-link 3G-SDI signal received at the input ports have failed. The interpolation uses pixel values received on one or more links of the quad-link 3G-SDI signal that have not failed.

In some embodiments, a method further includes removing skew from the quad-link 3G-SDI signal received at the input ports.

In some embodiments, a method further includes performing at least one of upsampling and downsampling of at least one signal received at the input ports. The method may further include performing trunking in the apparatus by: (i) downsampling each of a plurality of signals received at the input ports to produce a plurality of downsampled signals; and (ii) combining the downsampled signals into a 12G-SDI signal that is sent to the switch matrix. The method may further include (i) generating four 3 Gbps signals by: for each input port of four of the input ports, downsampling a 12G-SDI signal received at the input port into a 3 Gbps signal; and (ii) combining the four 3 Gbps signals into a 12G-SDI signal that is sent to the switch matrix.

In some embodiments, a method further includes performing at least one of upsampling and downsampling of at least one signal received from the switch matrix. The method may further include performing trunking in the apparatus by: (i) downsampling each of a plurality of 12G-SDI signals received from the switch matrix to produce a plurality of downsampled signals; and (ii) combining the downsampled signals into an output signal that is sent out one of the output ports. The method may further include: (i) downsampling each one of three 12G-SDI signals received from the switch matrix to generate three 3 Gbps signals; and (ii) incorporating the three 3 Gbps signals into a 10 Gbps Ethernet signal that is sent out of an output port.

In some embodiments, the quad-link 3G-SDI signal received at four of the input ports is quadrant mapping quad-link 3G-SDI or two sample interleave mapping quad-link 3G-SDI. The converting the 12G-SDI signal from the switch matrix into the corresponding quad-link 3G-SDI signal may include converting the 12G-SDI signal from the switch matrix into a quadrant mapping quad-link 3G-SDI signal or a two sample interleave mapping quad-link 3G-SDI signal.

Specific aspects and features will become apparent to those of ordinarily skill in the art upon review of the following description.

BRIEF DESCRIPTION OF THE DRAWINGS

Embodiments will be described, by way of example only, with reference to the accompanying figures wherein.

Like reference numerals are used in different figures to denote similar elements.

DETAILED DESCRIPTION

For illustrative purposes, specific example embodiments will now be explained in greater detail below in conjunction with the figures.

The embodiments set forth herein represent information sufficient to practice the claimed subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

As mentioned above, when 12 Gbps Serial Digital Interface (12G-SDI) Ultra-High Definition (UHD) standards were defined, the bridge standard "quad-link 3G-SDI" was also defined, which allows a 12 Gbps payload to be carried over four 3 Gbps physical links. What this means is that some equipment exists that implements the 12G-SDI interface, i.e., transmitting the UHD data over a single SDI link at 12 Gbps, whereas other equipment exists that implements the quad-link 3G-SDI interface, i.e., splitting the 12 Gbps payload into four 3 Gbps payloads and transmitting the four 3 Gbps payloads in parallel over four 3 Gbps physical links. For 12G-SDI, only a single cable is required to carry the complete signal payload. However, implementing 12G-SDI may be more technically challenging and more costly per physical link, and signals may not be carried as far on the 12G-SDI link compared to a quad-link 3G-SDI interface (e.g. a 12G-SDI signal may only be carried approximately one half the distance of a 3G-SDI signal). Quad-link 3G-SDI may be less expensive per link, simpler to implement, and have approximately double the cable reach of 12G-SDI. The downfall is that quad-link 3G-SDI requires 4 cables to be run for each signal payload. For this reason, quad-link 3G-SDI may have a higher overall cost of implementation. Thus, in light of these different trade-offs, some equipment implements the 12G-SDI interface, while other equipment instead implements the quad-link 3G-SDI interface.

In order to connect equipment that uses 12G-SDI with equipment that uses quad-link 3G-SDI, a device may be placed in between the equipment to convert one interface to the other. Such a device is sometimes called a "gearbox". A gearbox may convert quad-link 3G-SDI to 12G-SDI, 12G-SDI to quad-link 3G-SDI, or perform both functions.

Figure 1:
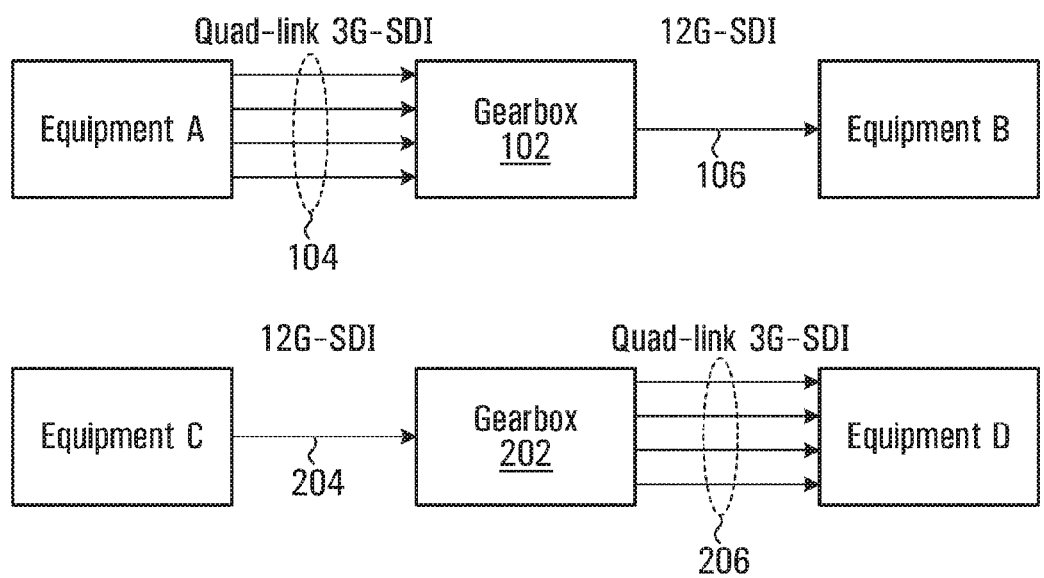
FIG. 1 is a schematic block diagram illustrating gearboxes converting between quad-link 3G-SDI and 12G-SDI.

FIG. 1 is a schematic block diagram illustrating gearboxes converting between quad-link 3G-SDI and 12G-SDI. Gearbox 102 receives (over four links) quad-link 3G-SDI from Equipment A, as shown at 104, and the gearbox 102 converts this to 12G-SDI, which is then sent (over one link) to Equipment B, as shown at 106. Conversely, gearbox 202 receives (on a single link) 12G-SDI from Equipment C, as shown at 204, and the gearbox 202 converts this to quad-link 3G-SDI, which is then sent (over four links) to Equipment D, as shown at 206.

An installation may require multiple gearboxes (as in FIG. 1) to adapt multiple pieces of equipment to interface with each other. In addition, the configuration may become awkward for a user when flexible signal routing and patching is required. For example, if multiple equipment with differing interfaces are connected to an SDI routing switcher, mechanisms may need to be put into place to allow any source (either 12G-SDI or Quad-link 3G-SDI) to be connected to any destination (either 12G-SDI or Quad-link 3G-SDI).

Figure 2:
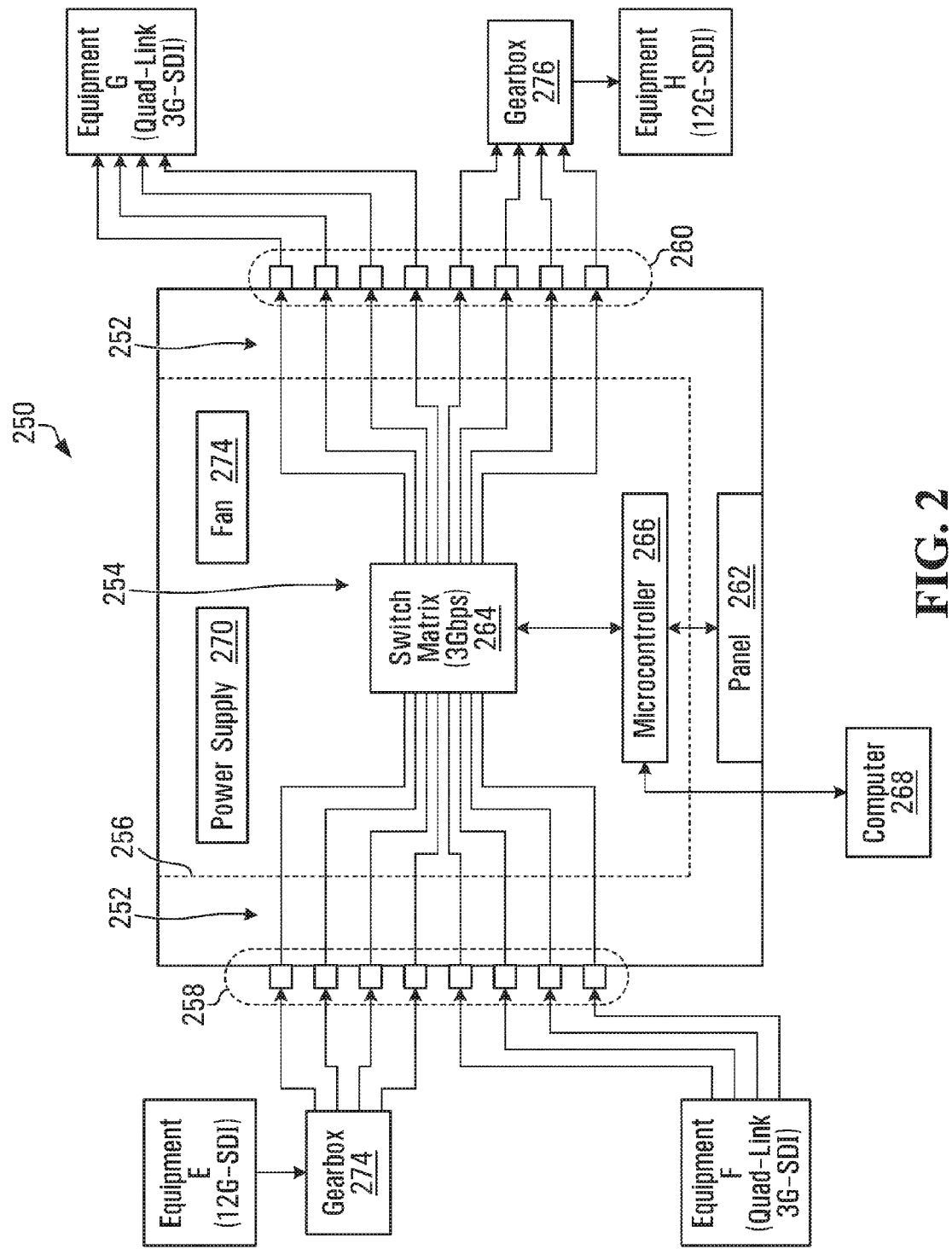
FIG. 2 is a simplified schematic block diagram of a 3G-SDI routing switcher.

Furthermore, some routing switchers do not support 12G-SDI, therefore necessitating all 12G-SDI signals to be processed by a gearbox to present as quad-link 3G-SDI for all sources and destinations. For example, FIG. 2 is a simplified schematic block diagram of an example 3G-SDI routing switcher 250 routing SDI signals between different equipment. The routing switcher 250 has an I/O region 252 and a switching matrix region 254, the boundary of which is shown by stippled line 256. In actual implementation, there may be no actual physical boundary or transition between these two regions. The I/O region 252 hosts the user interface(s) and any related processing. In particular, in the FIG. 2 embodiment, the I/O region 252 includes eight input ports 258 and eight output ports 260 to which the user may connect cables. The routing switcher 250 can route an incoming signal arriving at any of the input ports 258 to any of the output ports 260. A panel 262 having a user interface is also illustrated, which consists of user inputs, such as buttons (not shown), that allow a user to select which input port is to switch to which output port. The I/O region 252 may include some signal processing equipment (not shown), such as an equalizer connected to each of the input ports 258, a driver connected to each of the output ports 260, and clock re-timers.

The switching matrix region 254 includes a switch matrix 264, which is an integrated circuit chip that performs the actual switching of signals between the input ports 258 and the output ports 260. The switch matrix 264 is controlled by a microcontroller 266, which receives instructions from user inputs at the panel 262, as well as from an external computer 268. The routing switcher 250 may also include other components necessary or useful for its operation, such as a power supply 270 and a fan 272.

Note that only one switch matrix 264 integrated circuit chip is illustrated in FIG. 2. However, it will be appreciated that more generally the switching matrix region 254 could instead have multiple integrated circuit chips to implement the switching between the input and output ports. There could even be multiple switching matrix regions in some implementations (e.g. located on separate circuit boards). Also, only a single panel 262 is illustrated in FIG. 2, but more generally there may be multiple panels, and the panel(s) may be part of the same chassis as the rest of the routing switcher 250, or an external apparatus. Also, the exact location of the power supply 270 and fan 272 is implementation specific and is shown just as an example. More generally, there may be one or more power supplies and one or more fans, with the location of each dependent upon the implementation. The power supply (or power supplies) may even be external to the routing switcher 250. As another example, the microcontroller 266 may be in another location separate from the system in which the switch matrix is located. Also, more generally, the number of input and output ports may be much larger. In short, the FIG. 2 diagram is simplified for ease of explanation. In actual implementation, the exact size and specific structure, as well as the specific location of components, would depend upon the implementation.

The example routing switcher 250 of FIG. 2 is an 8×8 router, as it can receive up to 8 input signals and switch to up to 8 outputs. It operates at 3 Gbps and therefore can handle switching 3G-SDI signals. If a piece of equipment connected to the routing switcher 250 implements 12G-SDI, then an external gearbox is required. In the FIG. 2 illustration, four pieces of equipment are shown: Equipment E, F, G, and H. Equipment F and G both implement the quad-link 3G-SDI interface (i.e. send/receive quad-link 3G-SDI signals), whereas equipment E and H both implement the 12G-SDI interface (i.e. send/receive 12G-SDI signals). Gearbox 274 is therefore interposed between Equipment E and the routing switcher 250 to convert the 12G-SDI signal arriving from Equipment E into quad-link 3G-SDI, and gearbox 276 is interposed between Equipment H and the routing switcher 250 to convert quad-link 3G-SDI arriving from the routing switcher 250 into 12G-SDI.

In operation, a user utilizes the computer 268 to configure the routing switcher 250. For example, the user may utilize the computer 268 to configure the routing switcher 250 so that the four input ports receiving the quad-link 3G-SDI switch together. During operation of the routing switcher 250, the user may use the panel 252 to control the switching of signals between the input and output ports in order to route signals from Equipment E and F (sources) to Equipment G and H (destinations).

Note that if the routing switcher 250 is being used to route UHD signals, as illustrated, then the routing switcher 250 requires all sources and destinations to occupy 4 ports each. Furthermore, when a 12G-SDI source is routed to a 12G-SDI destination, it must be passed through two external gearboxes (one upstream of the routing switcher 250, and one downstream of the routing switcher 250). For example, if 12G-SDI Equipment E is routed to 12G-SDI Equipment H, it must be routed through two external gearbox devices 274 and 276, which is added complexity.

Using a 3 Gbps routing switcher, such as routing switcher 250 in FIG. 2, to route UHD (12 Gbps) signals is sometimes called "standardizing on quad-link 3G-SDI". A possible benefit of such an implementation is that the routing switcher only has to operate at 3 Gbps, which may be easier to design and achieve compared to routing at 12 Gbps. However, standardizing on quad-link 3G-SDI has possible drawbacks: notably, the requirement that each piece of UHD equipment must occupy four ports, and if a particular piece of equipment implements 12G-SDI, then an external gearbox is required to convert between 12G-SDI and quad-link 3G-SDI. Standardizing on quad-link 3G-SDI for the routing switcher may also introduce a further challenge to a user. In particular, a broadcast facility may provide manual patch panels for signals, which allow signal paths to be manually patched by connecting patch cables between sources and destinations. This may be done to allow more flexible configurations or to provide a passive emergency bypass path, should active equipment (including the routing switcher) fail. In quad-link 3G-SDI implementations, the user must manually patch 4 independent cables, which may take more time and may increase the likelihood of error compared to patching one cable carrying 12G-SDI. Also, when the routing switcher is to switch a quad-link 3G-SDI signal, it must be properly configured and instructed to switch all four links in the correct manner to keep the source links correlated with the four links of the desired destination. For example, with reference to FIG. 2, the routing switcher 250 does not know that the four inputs arriving from gearbox 274 are related (i.e. a quad-link, rather than 4 independent 3 Gbps signals). The user must use the computer 268 to configure the routing switcher 250 to switch these four links at the same time in the correct manner.

Figure 3:
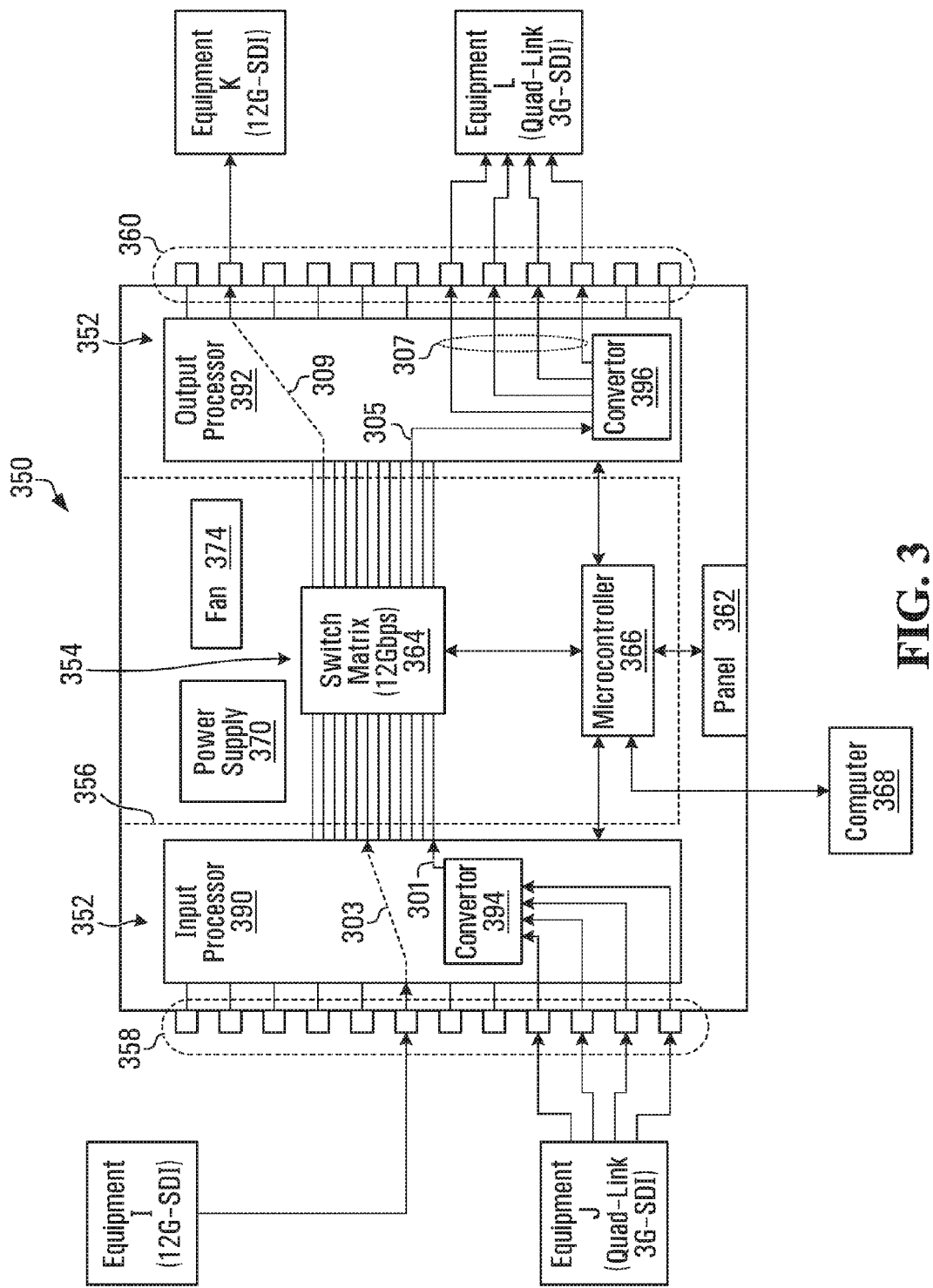
FIG. 3 is a simplified schematic block diagram of a 12G-SDI routing switcher.

FIG. 3 is a simplified schematic block diagram of an example 12G-SDI routing switcher 350. It is a native 12G capable routing switcher; i.e., the signals it routes internally within the routing switcher are 12 Gbps. The routing switcher 350 has an I/O region 352 and a switching matrix region 354, the boundary of which is shown by stippled line 356. In actual implementation, there may be no actual physical boundary or transition between these two regions. The I/O region 352 includes twelve input ports 358 and twelve output ports 360 to which the user may connect cables. The routing switcher 350 can route an incoming signal arriving at any of the input ports 358 to any of the output ports 360. A panel 362 is also illustrated having a user interface consisting of user inputs, such as buttons (not shown), that allow a user to select which input port is to switch to which output port. The I/O region 352 further includes an input processor 390, to which the input ports 358 are connected, and an output processor 392, to which the output ports 360 are connected. The input processor 390 and output processor 392 are constructed of one or more signal processing devices that are configured to perform the operations described herein. The input processor 390 and output processor 392 may be implemented using dedicated integrated circuitry, such as an ASIC or FPGA, or the input processor 390 and output processor 392 may be implemented using a general processor that executes instructions that cause the general processor to perform the operations of the input processor 390 and the output processor 392. The role of input processor 390 and output processor 392 will be described in detail below.

The I/O region 352 may also include some other signal processing devices not illustrated, such as an equalizer connected to each of the input ports 358 and a driver connected to each of the output ports 360.

The switching matrix region 354 includes a switch matrix 364, which is an integrated circuit chip that performs the actual switching of signals at 12 Gbps between the input processor 390 and the output processor 392. The switch matrix 364 is controlled by a microcontroller 366, which receives instructions from user inputs at the panel 362, as well as from an external computer 368. The routing switcher 350 may also include other components necessary or useful for its operation, such as a power supply 370 and a fan 372.

Note that only one switch matrix 364 integrated circuit chip is illustrated in FIG. 3. However, it will be appreciated that more generally the switching matrix region 354 could instead have multiple integrated circuit chips to implement the switching between the input and output ports. There could even be multiple switching matrix regions in some implementations (e.g. located on separate circuit boards). Also, only a single panel 362 is illustrated in FIG. 3, but more generally there may be multiple panels, and the panel(s) may be part of the same chassis as the rest of the routing switcher 350, or an external apparatus. Also, the exact location of the power supply 370 and fan 372 is implementation specific and is shown just as an example. More generally, there may be one or more power supplies and one or more fans, with the location of each dependent upon the implementation. The power supply (or power supplies) may even be external to the routing switcher 350. As another example, the microcontroller 366 may be in another location separate from the system in which the switch matrix is located. Also, more generally, the number of input and output ports may be much larger. In short, the FIG. 3 diagram is simplified for ease of explanation. In actual implementation, the exact size and specific structure, as well as the specific location of components, would depend upon the implementation.

The example routing switcher 350 is a 12×12 router, as it can receive up to 12 input signals and switch to up to 12 outputs. It operates at 12 Gbps internally and therefore can handle switching 12G-SDI signals. Therefore, if a piece of equipment connected to the routing switcher 350 implements 12G-SDI, then no external gearbox is required, and the piece of equipment can be directly connected to one port of the routing switcher 350. In the FIG. 3 illustration, four pieces of equipment are shown: Equipment I, J, K, and L. Equipment I and K both implement 12G-SDI and are directly connected to the routing switcher 350. On the other hand, Equipment J and L both implement quad-link 3G-SDI. However, these are also each directly connected to four ports of the routing switcher 350, without an external gearbox interposed between the equipment and the routing switcher 350. This is because such quad-link 3G-SDI signals can be accommodated and further processed by the input processor 390 and the output processor 392 of the routing switcher 350 in the manner explained below. In particular, the input processor 390 and the output processor 392 may perform the following operations.

(1) Conversion Between 12G-SDI and Quad-Link 3G-SDI

In one embodiment, the input processor 390 can convert a quad-link 3G-SDI signal received at four of the input ports 358 into a single 12G-SDI signal, thereby eliminating the need for an external gearbox to perform such a function. In particular, when equipment implementing quad-link 3G-SDI is connected to four of the input ports 358, as in the case for equipment J in FIG. 3, the user may indicate this to the microprocessor 366 through a user interface (e.g. via the panel 362 or the computer 368). The microprocessor 366 then informs the input processor 392 which input ports 358 have the quad-link 3G-SDI signal connected thereto, and the input processor 390 sends such signals to processing circuitry within the input processor 390 that performs a conversion function, illustrated as a convertor 394 in FIG. 3. The convertor 394 converts the quad-link 3G-SDI signal into a 12G-SDI signal and sends the 12G-SDI signal to the switch matrix 364, as shown at 301. For equipment that already provides a 12G-SDI signal, such as equipment I, the input processor 390 bypasses any convertor 394 circuitry, as shown at 303.

Conversion of a quad-link 3G-SDI signal into a 12G-SDI signal may be performed as follows. Deskewing is first performed to align the four incoming signals. Deskewing is discussed in detail below. If the quad-link 3G-SDI signal is formatted using "two sample interleave" mapping (defined later in relation to FIG. 5), then the four incoming signals are directly clocked from four 20 bit words into a new 80 bit word used for 12G-SDI. SMPTE standard ST425-5 is followed such that the 12G-SDI format clocks both lines required for two sample interleave formatting. If the quad-link 3G-SDI signal is instead formatted using "quadrant" mapping (defined later in relation to FIG. 4), then the four incoming signals are not clocked directly out given the placement of those pixels in the picture. Instead, a buffer is used to store the four incoming signals to account for the time delay between each incoming signal's appropriate placement in the new 12G-SDI stream.

In the example in FIG. 3, only one quad-link 3G-SDI signal is shown as being received at the input ports 358. However, in some embodiments the input processor 390 can simultaneously convert multiple quad-link 3G-SDI signals received at the input ports 358, by having several copies of the convertor 394, with each being used only as needed. Only one convertor 394 is shown for simplicity.

The output processor 392 also has a convertor 396, which can convert a 12G-SDI signal from the switch matrix 364 into a quad-link 3G-SDI signal to be output on four of the output ports 396, thereby eliminating the need for an external gearbox to perform such a function. In particular, when the user connects quad-link 3G-SDI equipment to four of the output ports 360, such as in the case of equipment L in FIG. 3, the user indicates this to the microprocessor 366 through a user interface (e.g. via the panel 362 or the computer 368). The microprocessor 366 then informs the output processor 392 which of the output ports 360 are to receive the quad-link 3G-SDI signal, and the output processor 392 sends the 12G-SDI signal destined for those output ports to processing circuitry that performs the conversion function, illustrated as a convertor 396 in FIG. 3. The convertor 396 converts the single 12G-SDI signal (shown at 305) into a quad-link 3G-SDI signal (shown at 307) and sends the quad-link 3G-SDI signal to the four output ports. For equipment that can already accommodate a 12G-SDI signal, such as equipment K, the output processor 392 bypasses any convertor 396 circuitry, as shown at 309.

Conversion of a 12G-SDI signal into a quad-link 3G-SDI signal may be implemented using the reverse operation of conversion from quad-link 3G-SDI to 12G-SDI described above. In particular, if the quad-link 3G-SDI signal is to be formatted using two sample interleave mapping (defined later in relation to FIG. 5), then each single 80 bit word of the 12G-SDI signal is partitioned into four 20 bit words to be clocked out as the four independent quad-link 3G-SDI signals, consistent with the formatting in SMPTE standard ST425-5. If the quad-link 3G-SDI signal is instead to be formatted using quadrant mapping (defined later in relation to FIG. 4), then a buffer is used to store the incoming 12G-SDI data such that each quad-link 3G-SDI signal, regardless of which quadrant position, is clocked out in parallel. The quad-link 3G-SDI signals therefore have up to a frame delay to account for this alignment.

In the example in FIG. 3, only one quad-link 3G-SDI signal is shown as being output from the output ports 360. However, in some embodiments the output processor 392 can simultaneously convert multiple 12G-SDI signals from the switch matrix 364 into respective quad-link 3G-SDI signals by having several copies of the convertor 396, with each being used as needed. Only one is shown for simplicity.

Having the convertors 394 and 396 in the routing switcher 350 may result in several advantages over a traditional routing switcher (such as routing switcher 250 of FIG. 2) that requires external gearbox devices to performing the converting between 12G-SDI and quad-link 3G-SDI. For example, the interconnection of equipment may be simplified since, regardless of whether the equipment implements 12G-SDI or quad-link 3G-SDI, the equipment can be connected directly to the routing switcher 350. In particular, for equipment that implements the 12G-SDI interface, there is no external gearbox that needs to be interposed between the routing switcher 350 and the equipment. No additional space, power or cabling is required for an external gearbox apparatus.

Also, with the routing switcher 350, the overall size of the routing switch matrix 364 may be reduced when quad-link 3G-SDI signals are being routed, compared to using a switch matrix that operates at 3 Gbps (as in the routing switcher 250 of FIG. 2). This is because in the routing switch matrix 364 of FIG. 3, each signal is routed as a single path through the switch matrix 364 at 12 Gbps, rather than requiring four paths for quad-link 3G-SDI signals. Additionally, the average number of I/O ports on the routing switcher 350, per piece of equipment, may be reduced if some of the equipment connected to the routing switcher 350 implements 12G-SDI, as 12G-SDI inputs and outputs only use a single input port and a single output port, rather than four input ports and four output ports, as in the routing switcher 250 of FIG. 2.

Removing the need for external gearboxes may also remove the need for tie lines external to the routing switcher. In particular, a routing switcher may be configured to have different levels associated with different sets of input/output ports. For example one level may route video, and one or more other levels my route audio channels. In some applications, some of the levels operate at data rates different from each other. In such a case, and where data from one level at 3G-SDI is to be moved to another level at 12G-SDI (or vice versa), in a routing switcher that does not have the internal convertors 394 and 396, a tie line connecting the two levels may need to run through one or more output ports, through an external gearbox, and then back through one or more input ports. This requires not only an external gearbox, but also occupies ports on the routing switcher. However, in the routing switcher 350, the provision of the 12G-SDI to quad-link 3G-SDI conversion (and vice versa) within the confines of the routing switcher 350 itself removes the need to designate input and output ports on a tie line path to pass through an external gearbox to perform such a conversion.

Finally, in the embodiment described above, when equipment implementing quad-link 3G-SDI is connected to four of the input ports 358, as in the case for equipment J in FIG. 3, the user indicates this to the microprocessor 366 through a user interface (e.g. via the panel 362 or the computer 368). Alternatively, in some embodiments, the input processor 390 may instead be configured to automatically detect the input standard (i.e. detect that a quad-link 3G-SDI signal is being received, rather than a 12G-SDI signal), and automatically perform the conversion from quad-link 3G-SDI to 12G-SDI. Automatic detection may be performed in many ways, and some non-limiting examples include: (1) obtaining an indication of the 3G-SDI standard from upstream devices, such as discrete reclocker/retimer integrated circuits (ICs) or equalizer ICs or even upstream equipment; (2) obtaining the indication of the 3G-SDI standard from the SDI receiver internal to the FPGA receiving the signal. For example, the indication may part of ancillary data that is received.

(2) Deskewing of Quad-Link 3G-SDI

In the routing switcher 350, since the input processor 390 has the knowledge that a particular group of 4 input ports carries a quad-link 3G-SDI signal, the input processor 390 may therefore provide quad-link 3G-SDI specific processing. This differs from a 3G-SDI router, such as routing switcher 250, in which the router itself does not have a direct understanding of the relationship between incoming signals and treats each link as an independent entity.

One such quad-link 3G-SDI specific processing function that may be performed by the routing switcher 350 is de-skewing, which is explained below.

Each one of the four links of a quad-link 3G-SDI signal is passed on individual cables. In implementation, the length of these four cables may vary, and the cables may pass through independent passive or processing equipment, whose latency may vary. Therefore, link-to-link skew may occur. This may also be called inter-channel delay. In order for downstream equipment to properly re-combine the links, it may be necessary for that equipment to implement de-skew buffers on its receivers. However, in severe cases, the de-skew buffers may not be large enough to compensate for the accumulated skew. In some embodiments, the input processor 390 may therefore perform de-skewing of the 4 incoming links so that the signal leaving the routing switcher 350 may have such skew mitigated or removed, thereby possibly assisting downstream equipment. Different de-skewing techniques may be used. In one embodiment, the synchronization data present in each of the words on each link is used. Specifically, the words arriving on each link, regardless of whether their synchronization data lines up or not (i.e. regardless of whether there is skew), are stored into a buffer. Once such words are stored in the buffer, they are then clocked out of the buffer with their synchronization data aligned, thereby mitigating or removing the link-to-link skew. The de-skewed signals are then converted in the convertor 394 into the single 12G-SDI signal. By performing this method of buffering and then reading out the buffered data with the synchronization data aligned, any eliminated link-to-link skew is not carried into the 12G-SDI signal. If the destination of the signal is also quad-link 3G-SDI equipment (e.g. equipment J communicating with equipment L in FIG. 3), then the output processor 390 converts the 12G-SDI signal back to quad-link 3G-SDI, but the removed skew is no longer present.

In this way, the routing switcher 350 may auto-correct delays between links of the quad-link 3G-SDI, and thereby provide deskewing. This may terminate the additive effect of the skewing and may make it easier for other equipment in the system to properly receive the signals. On quad-link 3G-SDI destinations, the phase of the four links may be guaranteed, and any upstream skew may be eliminated from the outgoing signals.

Figure 4:
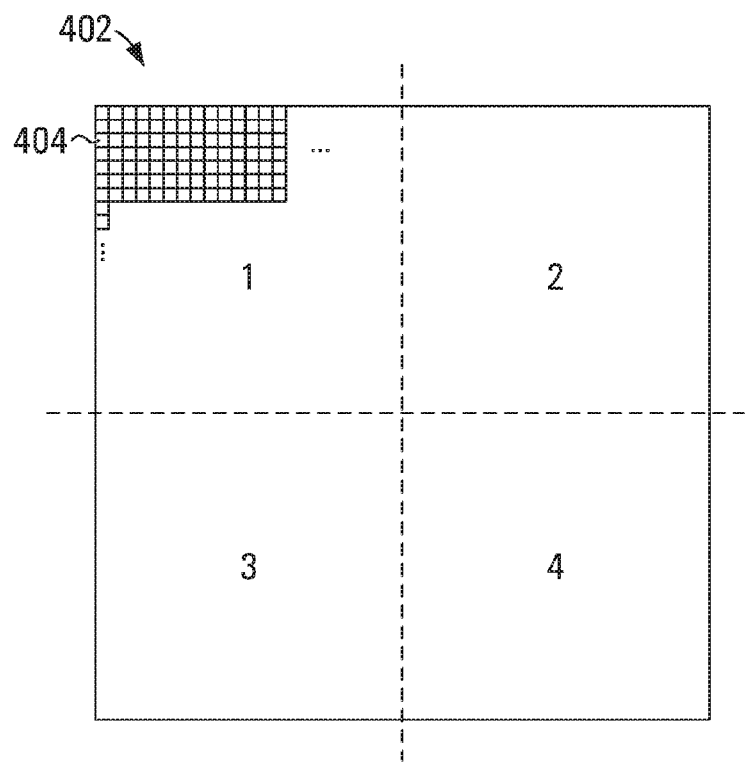
FIG. 4 illustrates one way in which a UHD image may be partitioned in order to transmit the image pixels using quad-link 3G-SDI.

(3) Accommodating Quad-Link 3G-SDI Signals Formatted Using Quadrant Mapping or Two Sample Interleave Mapping FIG. 4 illustrates one way in which a UHD image may be partitioned in order to transmit the image pixels using quad-link 3G-SDI. An image 402 is comprised of a plurality of pixels, only some of which are actually illustrated in FIG. 4 (e.g. pixel 404). Each pixel has a location in the image 402 indicated by a coordinate (x, y), as well as a corresponding pixel value of Y(x, y). The image is partitioned into four quadrants: 1, 2, 3, and 4. Each quadrant is a quarter of the image. Each quadrant is sent on a respective link of the quad-link 3G-SDI. This mapping technique may be referred to as "quadrant mapping", and this is how it will be referred to herein. Sometimes it may also be called "square division quad split" mapping. Such a mapping may be convenient to implement in some applications, but it has a possible downfall in that if a link fails, then a whole quarter of the image will be lost.

Figure 5:
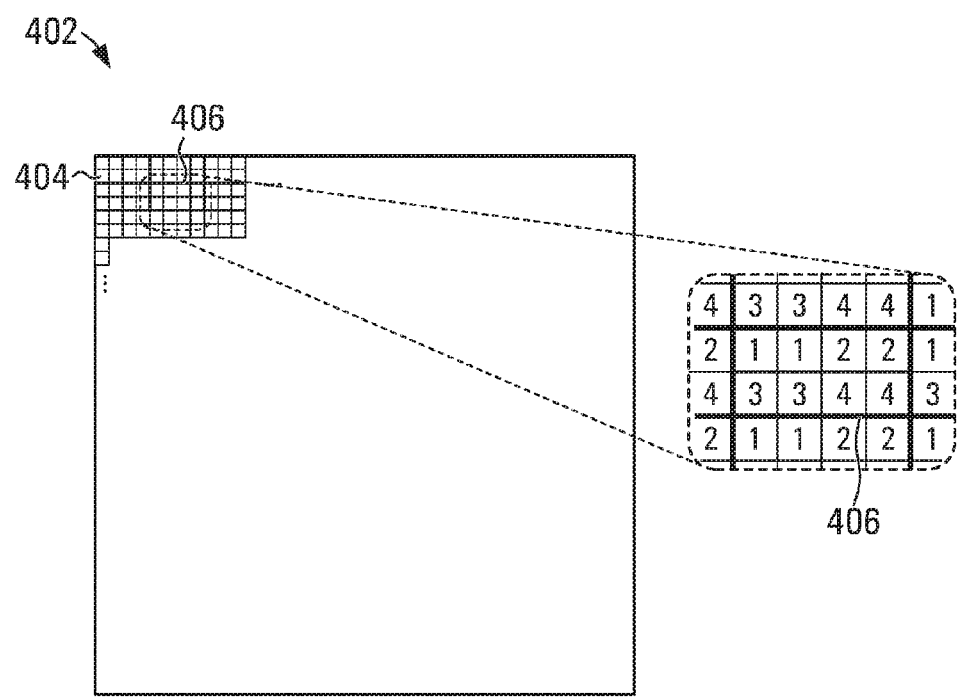
FIG. 5 illustrates another way in which a UHD image may be partitioned in order to transmit the image pixels using quad-link 3G-SDI.

FIG. 5 illustrates another way in which a UHD image may be partitioned in order to transmit the image pixels using quad-link 3G-SDI. The image 402 is instead partitioned into 2×4 tiles, one of which is indicated by reference character 406 in FIG. 5. Each 2×4 tile has the same format and is referred to as "2×4" because it is made up of 2 rows of pixels having 4 columns each, for a total of 8 pixels. The pixels labelled "1" in the tile are mapped to a first link of the quad-link 3G-SDI, the pixels labelled "2" are mapped to a second link of the quad-link 3G-SDI, the pixels labelled "3" are mapped to a third link of the quad-link 3G-SDI, and the pixels labelled "4" are mapped to a fourth link of the quad-link 3G-SDI. In this way, the quad-link 3G-SDI signals may be encoded in a manner where the final image interleaves the content of the four links. This mapping may be referred to as "two sample interleave mapping", and this is how it will be referred to herein. A possible benefit of two sample interleave mapping is that if one of the quad-link 3G-SDI links fails, the missing pixels are dispersed throughout the whole image, and so the displayed image would still resemble the intended image, just at a lower quality. There would not be a single large area of the image missing.

In one embodiment, the routing switcher 350 can accommodate quad-link 3G-SDI formatted using quadrant mapping or two sample interleave mapping. For example, the user may indicate via the computer 368 or panel 362 that a particular set of 4 input ports is to receive a quad-link 3G-SDI signal that has the quadrant mapping format. The input processor 390 is then instructed by the microcontroller 366 to perform the conversion from quadrant mapping quad-link 3G-SDI to 12G-SDI, which is performed by the convertor 394 in the manner described above. As another example, if the user indicated via the computer 368 or the panel 362 that the quad-link 3G-SDI signal had the two sample interleave mapping format, then the microcontroller 366 would instruct the input processor 390 to perform the conversion from two sample interleave mapping quad-link 3G-SDI to 12G-SDI, which is performed by the convertor 394 in the manner described above. In another embodiment, once the input processor 390 is aware that a set of four input ports is to receive quad-link 3G-SDI, the input processor 390 may itself automatically determine whether the mapping of the quad-link 3G-SDI signal is quadrant mapping or two sample interleave mapping, so that the user does not need to manually specify this. The automatic detection may be performed in many ways, and some non-limiting examples include: (1) obtaining an indication of the mapping from upstream devices, such as discrete reclocker/retimer ICs or equalizer ICs or even upstream equipment; (2) obtaining the indication of the mapping from the SDI receiver internal to the FPGA receiving the signal. For example, the indication may part of ancillary data that is received.

On the output side, if the user specifies that a particular set of 4 output ports is to output a quad-link 3G-SDI signal, in one embodiment the convertor 396 can convert the 12G-SDI signal from the switch matrix 364 into either quadrant mapping quad-link 3G-SDI or two sample interleave mapping quad-link 3G-SDI, depending upon the choice of the user.

The embodiment above allows the routing switcher 350 to transpose between quadrant mapping and two sample interleave mapping, thus allowing equipment of one mapping scheme to be connected to equipment of the other mapping scheme.

(4) Link Healing

Physical link failure is a possible risk of utilizing quad-link 3G-SDI interconnects. Physical link failure may occur due to electrical failure of the transmitting or receiving equipment, physical failure of the cable or connectors, or interference. Moreover, since there are four physical links in quad-link 3G-SDI, the likelihood of such a failure may be four times that of a single 12G-SDI link.

In the routing switcher 350, since the input processor 390 would have knowledge from the microcontroller 366 that a particular group of 4 input ports carries a quad-link 3G-SDI signal, in some embodiments the input processor 390 can provide a quad-link 3G-SDI specific processing function of link healing to try to compensate for failed links through interpolation. This is explained below.

Figure 6:
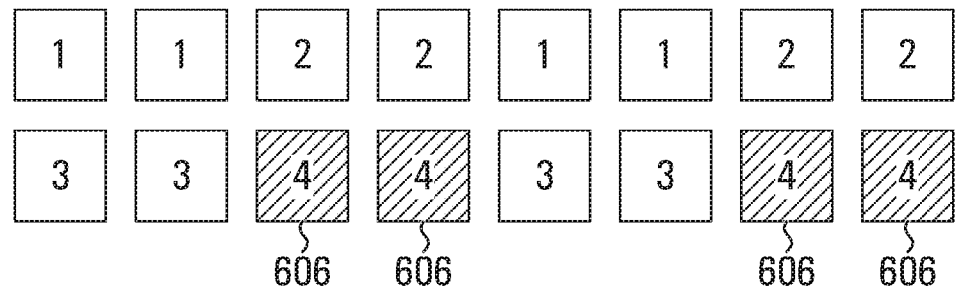
FIG. 6 illustrates two adjacent image tiles in the situation in which the fourth quad-link 3G-SDI signal link has failed.

Assume that the incoming quad-link 3G-SDI signal has the two sample interleave mapping format, as explained with reference to FIG. 5. With this encoding scheme, if one of the quad-link 3G-SDI signal links fails, then every fourth pixel would be lost. FIG. 6 illustrates two adjacent image tiles in the situation in which the fourth quad-link 3G-SDI signal link has failed. As shown at 606, the pixels carried by the failed link are lost.

In some embodiments, when one or more of the 3G-SDI signal links coming into the routing switcher 350 has failed, the input processor 390 may reconstruct such missing pixels through interpolation of neighboring pixels carried on the surviving links. As input processor 390 has an understanding of the relationship between the four links (i.e. it knows that they carry a quad-link 3G-SDI signal having the two sample interleave mapping format), then it can intelligently perform this interpolation. This principle can be applied, so long as at least one of the four links is intact on the receiver.

Figure 7:
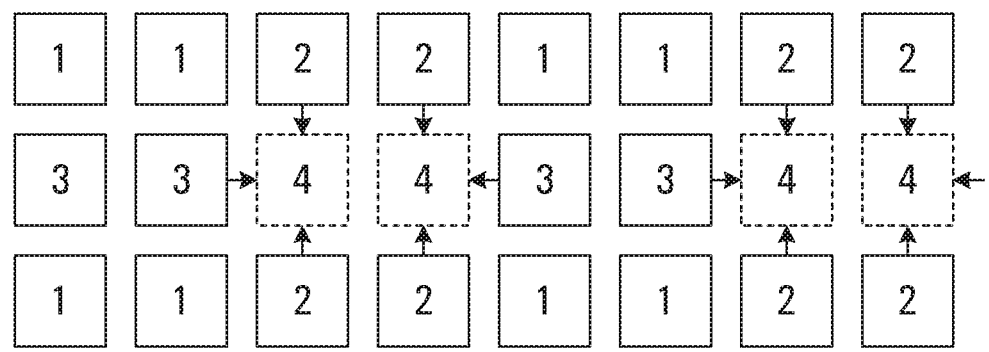
FIG. 7 illustrates image tiles in which neighbouring pixels are used to interpolate pixel values for missing pixels.

FIG. 7 illustrates image tiles in which neighbouring pixels are used to interpolate pixel values for missing pixels. In this particular example, link 4 has failed, and each missing pixel value from link 4 is constructed using the pixel values immediately adjacent in the image on links 2 and 3. Many different types of image interpolation may be used. As a simple example, in one embodiment an average of the pixel values of the received pixels bordering the missing pixel in the image may be determined, and that average set as the missing pixel value. As another example, bilinear interpolation may be performed, as follows: assume $Y(x, y)$ is the missing pixel value, but four neighbouring pixel values $Y(x_1, y_1)$, $Y(x_1, y_2)$, $Y(x_2, y_1)$, and $Y(x_2, y_2)$ are known. Then, the missing pixel value $Y(x, y)$ may be estimated as:

$$Y(x, y) = \frac{1}{(x_2 - x_1)(y_2 - y_1)}[(x_2 - x)(y_2 - y)Y(x_1, y_1) + (x - x_1)(y_2 - y)Y(x_2, y_1) + (x_2 - x)(y - y_1)Y(x_1, x_2) + (x - x_1)(y - y_1)Y(x_2, y_2)].$$

The equation above can be obtained as follows:
(1) First, perform linear interpolation in the x-direction:

$$Y_1 = \frac{(x_2 - x)}{(x_2 - x_1)}Y(x_1, y_1) + \frac{(x - x_1)}{(x_2 - x_1)}Y(x_2, y_1);$$

and $$Y_2 = \frac{(x_2 - x)}{(x_2 - x_1)}Y(x_1, y_2) + \frac{(x - x_1)}{(x_2 - x_1)}Y(x_2, y_2).$$

(2) Then interpolate in the y-direction to obtain the desired estimate for $Y(x, y)$:

$$\begin{aligned}Y(x, y) &= \frac{(y_2 - y)}{(y_2 - y_1)}Y_1 + \frac{(y - y_1)}{(y_2 - y_1)}Y_2 \\ &= \frac{(y_2 - y)}{(y_2 - y_1)}\left[\frac{(x_2 - x)}{(x_2 - x_1)}Y(x_1, y_1) + \frac{(x - x_1)}{(x_2 - x_1)}Y(x_2, y_1)\right] + \\ &\quad \frac{(y - y_1)}{(y_2 - y_1)}\left[\frac{(x_2 - x)}{(x_2 - x_1)}Y(x_1, y_2) + \frac{(x - x_1)}{(x_2 - x_1)}Y(x_2, y_2)\right] \\ &= \frac{1}{(x_2 - x_1)(y_2 - y_1)}[(x_2 - x)(y_2 - y)Y(x_1, y_1) + \\ &\quad (x - x_1)(y_2 - y)Y(x_2, y_1) + (x_2 - x)(y - y_1)Y(x_1, y_2) + \\ &\quad (x - x_1)(y - y_1)Y(x_2, y_2)].\end{aligned}$$

It will be appreciated that other types of interpolation could be performed instead (e.g. a higher order of interpolation that uses a higher order of polynomial in the x-axis and y-axis).

In this way, failed link 4 may be reconstructed from neighboring pixels carried on links 1, 2 and 3. This method may be extended to situations where 2 or 3 links have failed, with interpolation performed for the pixels carried on each failed link using available neighbouring pixels carried on the link(s) that have not failed. As will be appreciated, the more surviving links present at the input, the better the chances the interpolation will more effectively "heal" the missing links (i.e. the higher the chances of the image looking closer to how it is supposed to look if there were no missing links). The mechanism of interpolation may be adjusted to trade off the quality, speed, and logic resources. However, the bilinear interpolation noted above may be achieved with fewer logic resources and processing time penalty compared to some other more advanced interpolation techniques. In some embodiments, the user could use the computer 368 to decide which interpolation technique (if any) is to be used.

Finally, in some embodiments, the input processor 390 may be able to automatically detect any invalid or missing signals in an incoming quad-link 3G-SDI signal (i.e. automatically determine whether one or more links are missing). In such a case the input processor 390 may be configured to then automatically perform the link healing. Automatic detection of a missing signal may be performed in many ways, and some non-limiting examples include: (1) obtaining the signal status from upstream devices, such as discrete reclocker/retimer ICs, equalizer ICs, or even upstream equipment; (2) obtaining the signal status from the SDI receiver internal to the FPGA performing the correction; (3) obtaining an indication that the timing is outside of the required capture window (i.e. outside of the deskew buffer size); (4) by a management control system providing direction on the incoming signals.

(5) Upsampling and Downsampling

In some embodiments, the input processor 390 and output processor 392 also permit up-sampling and down-sampling of the signals, such as between HD signals (3G-SDI) and UHD (12G-SDI) signals. This may be used to provide low-bandwidth versions of a UHD signal, which may be useful in situations in which the full resolution of the original image is not required downstream, or the bandwidth is not available downstream to transmit the full-resolution image.

The downsampling and upsampling may allow for multiple signals to be passed on a single high-bandwidth path in a method known as trunking. For example, four independent 12G-SDI signals received at input ports 358 of the routing switcher 350 may be down-sampled to 3 Gbps each in the input processor 390 and then combined in the input processor 390 into a single 12G-SDI signal sent to switch matrix 364. As one example, every fourth pixel may be extracted from each one of the four incoming 12G-SDI signals, and then the four down sampled signals treated as quad-link 3G-SDI and converted into a single 12G-SDI signal in the manner discussed earlier. Downsampling of this nature is sometimes also referred to as decimation. More advanced downsampling may instead be performed that is specific to video and that uses interpolation as part of converting from 3 Gbps to 12 Gbps and/or vice versa.

Alternatively, in another embodiment, down-sampling of the four independent 12G-SDI signals may be performed at the output processor 392. That is, four independent 12G-SDI signals from the switch matrix 364 may be down-sampled to 3 Gbps each in the output processor 392 and then combined in the output processor 390 into a single 12 Gbps link sent out of a single output port of the routing switcher 350.

As another example, three independent 12G-SDI signals may be downsampled to 3 Gbps and then combined and routed onto a single 10G Ethernet link (assuming one of the output ports 360 of the routing switcher 350 is an Ethernet port). For example, three independent 12G-SDI signals may each be downsampled to 3 Gbps by removing every fourth pixel (or by using a more advanced form of downsampling), and then the three 3 Gbps signals may be sent across the 10G Ethernet link, e.g. using SMPTE 2022-6 or another video-to-Ethernet conversion. The downsampling may occur at the input processor 390 or the output processor 392. Other such trunking combinations exist and could be performed.

In another embodiment, upsampling of a signal may be performed by the input processor 390 if a signal arrives at one of the input ports at a rate less than 12 Gbps. The upsampling may be performed using interpolation. For example, the incoming signal may be stored in a buffer, and groups of pixels in the incoming signal may each be used to compute a respective additional pixel value using interpolation. The interpolated pixel values may then be inserted into the incoming signal, and the signal may then be clocked out of the buffer at 12 Gbps. The number of interpolated pixels calculated and inserted into the incoming signal is selected based on the incoming signal rate in order to ensure that the upsampled signal rate is 12 Gbps.

Since sub-sampling is performed as part of the process of converting from a 12G-SDI signal to a quad-link 3G-SDI signal, incorporating the additional up and down sampling capability discussed above may come at a reduced logic cost, as some of such logic may already be provided to implement the 12G-SDI to quad-link 3G-SDI conversion.

Operation of the Routing Switcher 350

In operation, a user utilizes the computer 368 and/or panel 362 to configure the routing switcher 350 to indicate which sets of 4 input ports (if any) are to receive quad-link 3G-SDI, and of which format (e.g. quadrant mapping or two sample interleave mapping). Alternatively, if the routing switcher 350 has the ability to automatically determine whether a signal at its input ports is quad-link 3G-SDI and/or has the ability to automatically detect which format an incoming quad-line 3G-SDI signal has (as mentioned in some embodiments above), then the user may instead enable this function, if necessary.

The user also indicates which sets of 4 output ports (if any) are to output quad-link 3G-SDI, and of which format. Assuming an incoming quad-link 3G-SDI signal, the user may also indicate whether link healing and/or de-skewing is to be performed. Alternatively, in some embodiments these functions may be performed automatically. For example, the routing switcher 350 may be configured to always perform de-skewing of an incoming quad-link 3G-SDI signal, such that the user does not need to manually enable this. As another example, the routing switcher 350 may be configured to automatically detect one or more missing quad-links and automatically perform link healing, such that the user does not need to manually enable this.

In some embodiments, the routing switcher 350 may also be configured such that a user may be able to manually force link healing to be performed on one or more incoming quad-links. An example of when this may be desirable is if a particular quad-link is present, but for some reason the wrong video signal is being communicated on that link.

The user may also configure any upsampling or down-sampling operations.

Then, during operation, the input processor 390 and output processor 392 perform any needed conversion between 12G-SDI and quad-link 3G-SDI, as well as perform any of the other operations described above, as configured (e.g. link healing, deskewing, up and/or down sampling). During operation of the routing switcher 350, the user may use the panel 352 to switch signals between the input and output ports in order to route signals from equipment connected to the input ports 358 to equipment connected to the output ports 360.

With the routing switcher 350 of FIG. 3, interfaces to convert between 12G-SDI and quad-link 3G-SDI may therefore be created as necessary, on-the-fly. When quad-link 3G-SDI is received at the routing switcher 350, the routing switcher 350 has knowledge of these related links (i.e. it knows the set of four links arriving on the designated input ports is quad-link 3G-SDI), and in one embodiment it can therefore deskew and/or heal missing links. The routing switcher 350 can operate using a smaller switch matrix 364 than the routing switcher 250 of FIG. 2 for any given number of UHD equipment, since the switch matrix 364 switches at 12G-SDI, not 3G-SDI. Also, assuming at least one piece of UHD equipment using the routing switcher 350 implements 12G-SDI, then for a given number of UHD equipment the routing switcher 350 requires fewer ports, as any 12G-SDI equipment can be connected to a single port, rather than having the covert to quad-link 3G-SDI by an external gearbox and then connect to four ports (as would be the case for routing switcher 250). Also, for the routing switcher 350, some trunking operations may be implemented at reduced logic cost since the logic for converting between 12G-SDI and quad-link 3G-SDI is already present and may be utilized.

Figure 8:
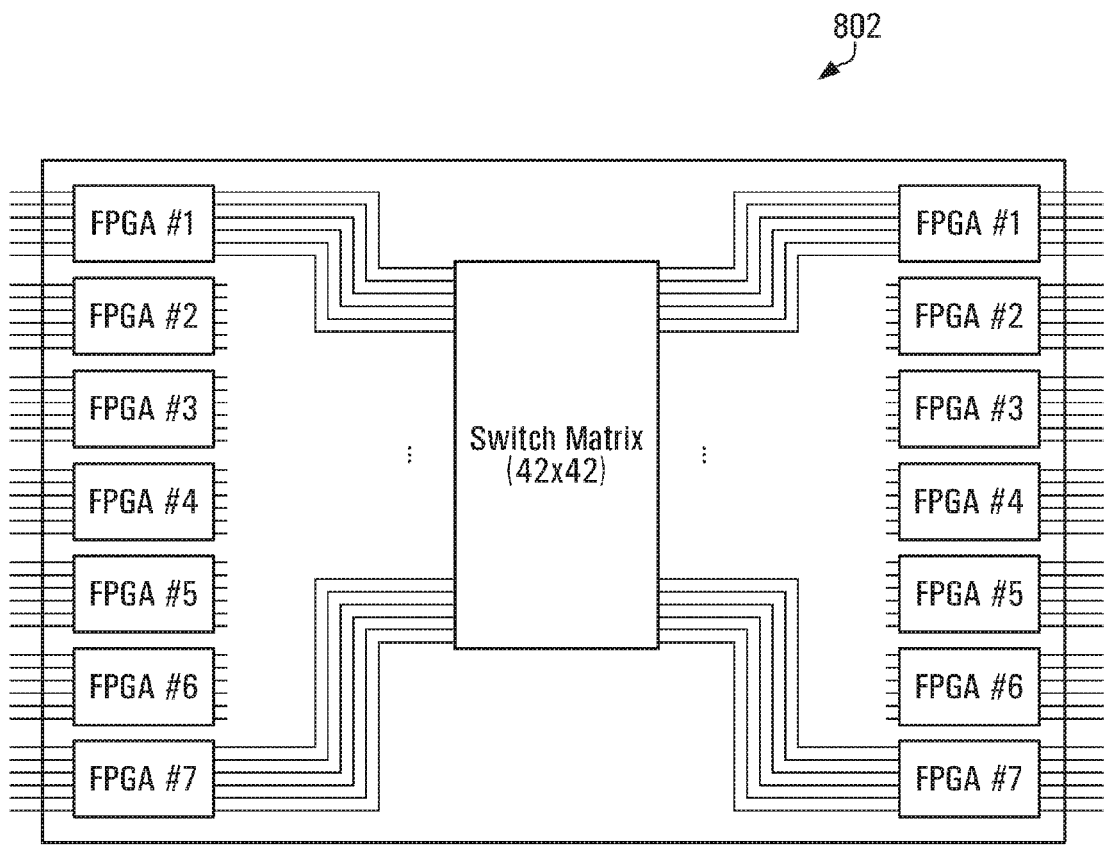
FIG. 8 illustrates a 42×42 routing switcher in which 7 FPGAs each serve as the input and output processors.

Note that some or all of the input processor 390 and output processor 392 could be implemented by shared circuitry. As an example, FIG. 8 illustrates a 42×42 routing switcher 802 having 7 FPGAs, each one of which serving as the input and output processor for a respective set of 6 input ports and 6 output ports. In this embodiment, each group of 6 input ports can only receive up to one quad-link 3G-SDI signal (on 4 of the 6 input ports), and each group of 6 output ports can only provide as an output up to one quad link 3G-SDI signal (on 4 of the 6 output ports).

Figure 9:
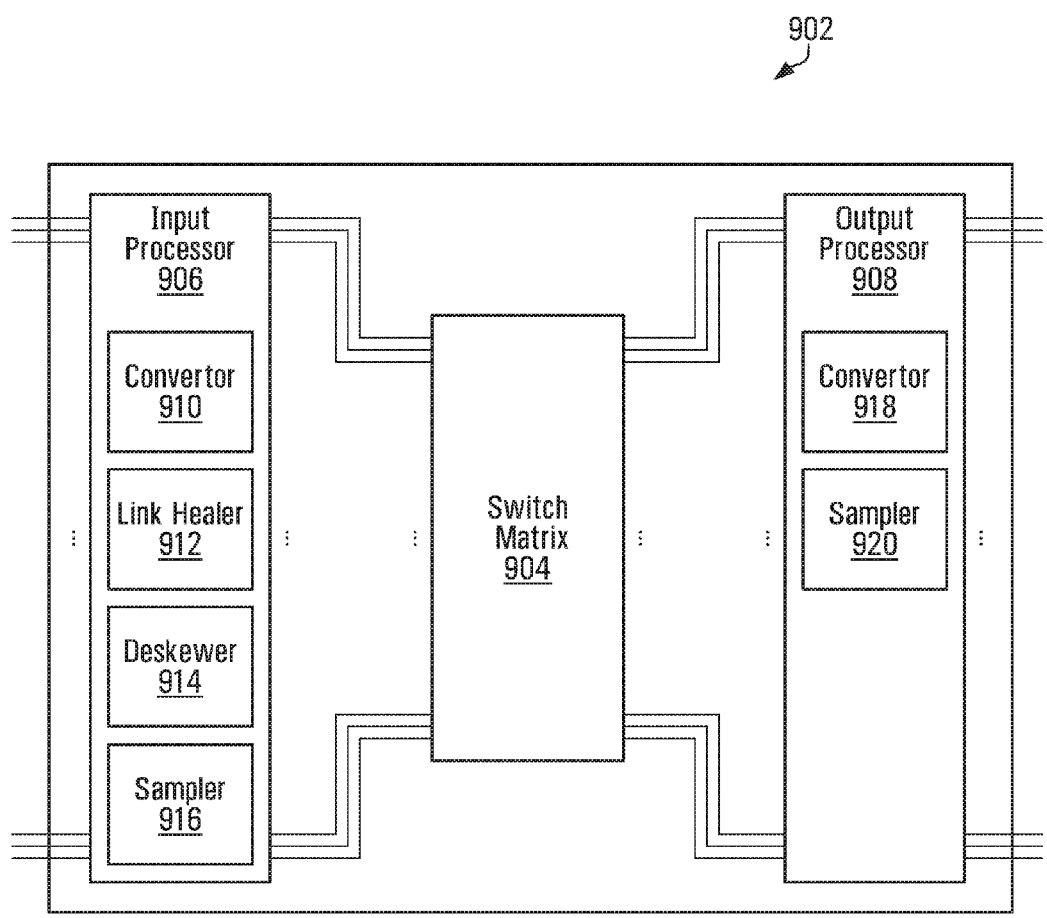
FIG. 9 illustrates an apparatus having a switch matrix to route 12G-SDI data signals between input ports and the output ports.

More generally, FIG. 9 illustrates a routing apparatus 902 having N input ports and N output ports, and an N×N switch matrix 904 to route 12G-SDI data signals between the input ports and the output ports. An input processor 906 is interposed between the input ports and the switch matrix 904, and an output processor 908 is interposed between the output ports and the switch matrix 904. The input processor 906 has at least one of each of: a convertor 910 for performing conversion from quad-link 3G-SDI to 12G-SDI (for both quadrant mapping and two sample interleave mapping quad-link 3G-SDI); a link healer 912 for performing the interpolation for one or more missing quad-link 3G-SDI links; a deskewer 914 for performing the deskewing of a quad-link 3G-SDI signal; and a sampler 916 for performing the upsampling and/or downsampling discussed above. The output processor 908 has at least one of each of: a convertor 918 to convert from 12G-SDI to quad-link 3G-SDI (for both quadrant mapping and two sample interleave mapping quad-link 3G-SDI); and a sampler 920 for performing the upsampling and/or downsampling discussed above. The input processor 906 and the output processor 908 are meant to illustrate processing circuitry that implements the illustrated modules: convertor 910, link healer 912, deskewer 914, sampler 916, convertor 918, and sampler 920. The physical structure may, for example, be an FPGA, ASIC, or processor that executes instructions stored in a memory. Also, in the illustrated embodiments the input and output processors and the various modules they implement (convertors, link healer, deskewer, samplers) are shown as physically located between the ports and the switch matrix. The input and output processors (and the modules they implement) are interposed between the ports and the switch matrix in that they are between the switch matrix and the ports in the data path. For example, the convertor 910 is interposed between the input ports and the switch matrix 904, as signals received at the input ports can be passed through the convertor 910 prior to the switch matrix 904. However, it will be appreciated that depending upon the location of the actual components in the system, the input and output processors (and the modules they implement) may not be physically located between the switch matrix and the ports.

Embodiments are also contemplated in which link healing, de-skewing, and/or up/down sampling are not performed. For example, an apparatus is contemplated having a plurality of input ports and a plurality of output ports. The apparatus also includes a switch matrix to route 12G-SDI signals between the input ports and the output ports. The apparatus further includes a first convertor interposed between the input ports and the switch matrix. The first convertor to convert a quad-link 3G-SDI signal received at four of the input ports into a 12G-SDI signal destined for the switch matrix. The apparatus further includes a second convertor interposed between the switch matrix and the output ports. The second convertor is to convert a 12G-SDI signal received from the switch matrix into a quad-link 3G-SDI signal destined for four of the output ports.

Figure 10:
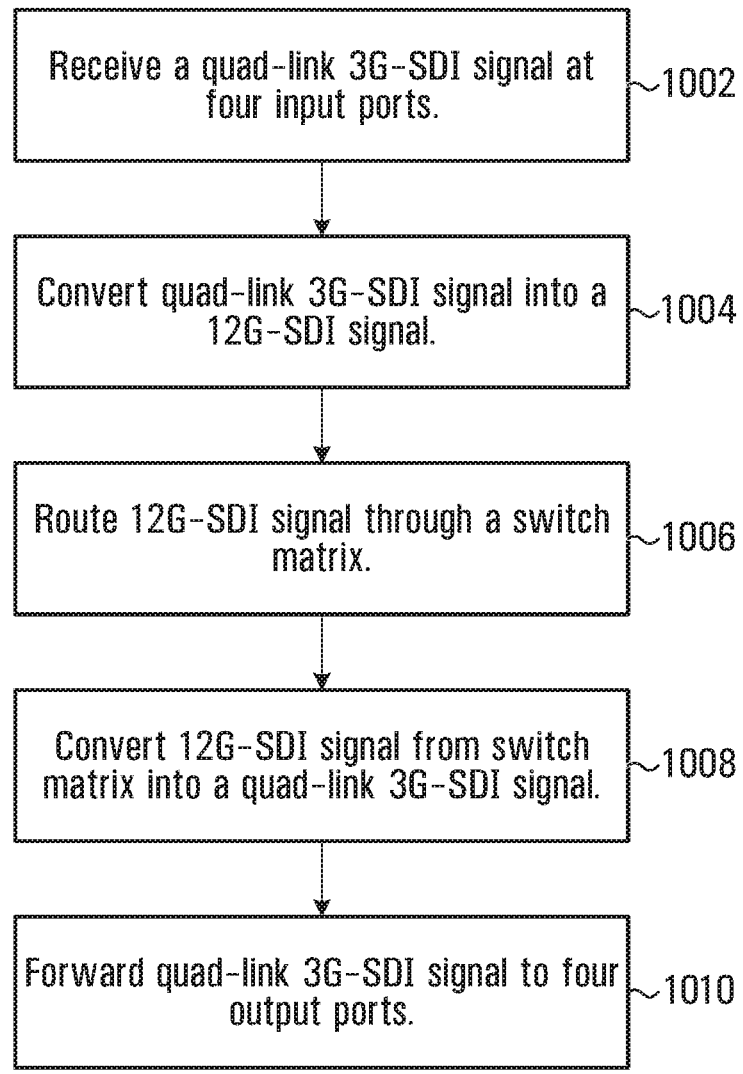
FIG. 10 is a flow chart illustrating a method of switching.

FIG. 10 is a flow chart illustrating a method of switching according to one embodiment. This method is performed by a routing apparatus, which may (for example) be routing switcher 350 or routing switcher 902. In step 1002, a quad-link 3G-SDI signal is received at four input ports. In step 1004, the quad-link 3G-SDI signal is converted into a corresponding 12G-SDI signal within the apparatus. In step 1006, the corresponding 12G-SDI signal is routed through a switch matrix. Optionally, in step 1008, a 12G-SDI signal from the switch matrix is converted into a corresponding quad-link 3G-SDI signal, and in step 1010, the corresponding quad-link 3G-SDI signal is forwarded to four output ports.

Although the foregoing has been described with reference to certain specific embodiments, various modifications thereof will be apparent to those skilled in the art without departing from the scope of the claims appended hereto.

As one example, the routing switcher 350 or routing switcher 902 are described as having the capability to perform all of: conversion between quad-link 3G-SDI and 12G-SDI (accommodating both quadrant mapping and two sample interleave mapping quad-link 3G-SDI format), link healing, de-skewing, and up/down sampling. However, embodiments are also contemplated in which only one or a subset of all of such capabilities are provided in the routing switcher. The input processor 390 and output processor 392 may also perform additional processing not described above, such as clock re-timing.

As another example, the embodiments described above are explained in the context of a routing switcher. However, the methods described herein may also be implemented in a production switcher or a master control switcher. More generally, the methods described herein may be performed by a routing apparatus.

Finally, it will be appreciated that any module, component, or device exemplified herein that executes instructions (e.g. the input and output processors of the routing switcher in some embodiments) may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. An apparatus comprising:
   a plurality of input ports and a plurality of output ports;
   a switch matrix to route 12 Gigabits per second Serial Digital Interface (12G-SDI) signals between the input ports and the output ports;
   a first convertor interposed between the input ports and the switch matrix, the first convertor to convert a quad-link 3 Gigabits per second Serial Digital Interface (3G-SDI) signal received at four of the input ports into a 12G-SDI signal destined for the switch matrix;
   a second convertor interposed between the switch matrix and the output ports, the second convertor to convert a 12G-SDI signal received from the switch matrix into a quad-link 3G-SDI signal destined for four of the output ports;
   a link healer interposed between the input ports and the switch matrix, the link healer to perform interpolation to compute missing pixel values when one or two or three links of the quad-link 3G-SDI signal received at the input ports have failed, the interpolation using pixel values received on one or more links of the quad-link 3G-SDI signal that have not failed.

2. The apparatus of claim 1, wherein the interpolation is bilinear interpolation.

3. An apparatus comprising:
a plurality of input ports and a plurality of output ports;
a switch matrix to route 12 Gigabits per second Serial Digital Interface (12G-SDI) signals between the input ports and the output ports;
a first convertor interposed between the input ports and the switch matrix, the first convertor to convert a quad-link 3 Gigabits per second Serial Digital Interface (3G-SDI) signal received at four of the input ports into a 12G-SDI signal destined for the switch matrix;
a second convertor interposed between the switch matrix and the output ports, the second convertor to convert a 12G-SDI signal received from the switch matrix into a quad-link 3G-SDI signal destined for four of the output ports;
a deskewer interposed between the input ports and the switch matrix, the deskewer to remove skew from the quad-link 3G-SDI signal received at the input ports.

4. The apparatus of claim 1, further comprising a sampler interposed between the input ports and the switch matrix, the sampler to perform at least one of upsampling and downsampling of at least one signal received at the input ports.

5. The apparatus of claim 4, wherein the sampler is to perform trunking by: (i) downsampling each of a plurality of signals received at the input ports to produce a plurality of downsampled signals; and (ii) combining the downsampled signals into a 12G-SDI signal to be sent to the switch matrix.

6. The apparatus of claim 4, wherein the sampler is to:
(i) generate four 3 Gigabits per second (3 Gbps) signals by: for each input port of four of the input ports, downsampling a 12G-SDI signal received at the input port into a 3 Gbps signal; and
(ii) combine the four 3 Gbps signals into a 12G-SDI signal to be sent to the switch matrix.

7. The apparatus of claim 1, further comprising a sampler interposed between the switch matrix and the output ports, the sampler to perform at least one of upsampling and downsampling of at least one signal received from the switch matrix.

8. The apparatus of claim 7, wherein the sampler is to perform trunking by: (i) downsampling each of a plurality of 12G-SDI signals received from the switch matrix to produce a plurality of downsampled signals; and (ii) combining the downsampled signals into an output signal to be sent out one of the output ports.

9. The apparatus of claim 7, wherein the sampler is to:
(i) downsample each one of three 12G-SDI signals received from the switch matrix to generate three 3 Gigabits per second (3 Gbps) signals; and
(ii) incorporate the three 3 Gbps signals into a 10 Gbps Ethernet signal to be sent out of an output port.

10. The apparatus of claim 1, wherein:
the first convertor is to convert from quadrant mapping quad-link 3G-SDI to 12G-SDI and from two sample interleave mapping quad-link 3G-SDI to 12G-SDI; and
the second convertor is to convert from 12G-SDI to quadrant mapping quad-link 3G-SDI and from 12G-SDI to two sample interleave mapping quad-link 3G-SDI.

11. The apparatus of claim 1, wherein the apparatus is a routing switcher or a production switcher or a master control switcher.

12. A method comprising:
receiving a quad-link 3 Gigabits per second Serial Digital Interface (3G-SDI) signal at four input ports of a routing apparatus;
converting the quad-link 3G-SDI signal into a corresponding 12G-SDI signal within the apparatus;
routing the corresponding 12G-SDI signal through a switch matrix;
converting a 12G-SDI signal from the switch matrix into a corresponding quad-link 3G-SDI signal; and
forwarding the corresponding quad-link 3G-SDI signal to four output ports of the apparatus;
the method further comprising performing interpolation in the apparatus to compute missing pixel values when one or two or three links of the quad-link 3G-SDI signal received at the input ports have failed, the interpolation using pixel values received on one or more links of the quad-link 3G-SDI signal that have not failed.

13. The method of claim 12, wherein the interpolation is bilinear interpolation.

14. A method comprising:
receiving a quad-link 3 Gigabits per second Serial Digital Interface (3G-SDI) signal at four input ports of a routing apparatus;
converting the quad-link 3G-SDI signal into a corresponding 12G-SDI signal within the apparatus;
routing the corresponding 12G-SDI signal through a switch matrix;
converting a 12G-SDI signal from the switch matrix into a corresponding quad-link 3G-SDI signal; and
forwarding the corresponding quad-link 3G-SDI signal to four output ports of the apparatus;
the method further comprising removing skew from the quad-link 3G-SDI signal received at the input ports.

15. The method of claim 14, further comprising performing at least one of upsampling and downsampling of at least one signal received at the input ports.

16. The method of claim 15, comprising performing trunking in the apparatus by: (i) downsampling each of a plurality of signals received at the input ports to produce a plurality of downsampled signals; and (ii) combining the downsampled signals into a 12G-SDI signal that is sent to the switch matrix.

17. The method of claim 15, comprising:
(i) generating four 3 Gigabits per second (3 Gbps) signals by: for each input port of four of the input ports, downsampling a 12G-SDI signal received at the input port into a 3 Gbps signal; and
(ii) combining the four 3 Gbps signals into a 12G-SDI signal that is sent to the switch matrix.

18. The method of claim 14, further comprising performing at least one of upsampling and downsampling of at least one signal received from the switch matrix.

19. The method of claim 18, comprising performing trunking in the apparatus by:
(i) downsampling each of a plurality of 12G-SDI signals received from the switch matrix to produce a plurality of downsampled signals; and
(ii) combining the downsampled signals into an output signal that is sent out one of the output ports.

20. The method of claim 18, comprising:
(i) downsampling each one of three 12G-SDI signals received from the switch matrix to generate three 3 Gigabits per second (3 Gbps) signals;

(ii) incorporating the three 3 Gbps signals into a 10 Gbps Ethernet signal that is sent out of an output port.

21. The method of claim 14, wherein the quad-link 3G-SDI signal received at four of the input ports is quadrant mapping quad-link 3G-SDI or two sample interleave mapping quad-link 3G-SDI; and wherein converting the 12G-SDI signal from the switch matrix into the corresponding quad-link 3G-SDI signal comprises converting the 12G-SDI signal from the switch matrix into a quadrant mapping quad-link 3G-SDI signal or a two sample interleave mapping quad-link 3G-SDI signal.

22. The method of claim 14, wherein the apparatus is a routing switcher or a production switcher or a master control switcher.

* * * * *